United States Patent
Suzuki et al.

(10) Patent No.: US 11,806,778 B2
(45) Date of Patent: Nov. 7, 2023

(54) MOLDING SYSTEM

(71) Applicant: SINTOKOGIO, LTD., Nagoya (JP)

(72) Inventors: Umihiko Suzuki, Nagoya (JP);
Takehiro Sugino, Nagoya (JP)

(73) Assignee: SINTOKOGIO, LTD., Nagoya (JP)

( * ) Notice: Subject to any disclaimer, the term of this patent is extended or adjusted under 35 U.S.C. 154(b) by 0 days.

(21) Appl. No.: 18/101,137

(22) Filed: Jan. 25, 2023

(65) Prior Publication Data
US 2023/0294164 A1    Sep. 21, 2023

(30) Foreign Application Priority Data

Mar. 16, 2022   (JP) .................. 2022-041554

(51) Int. Cl.
| | |
|---|---|
| *B22C 19/04* | (2006.01) |
| *B22C 15/28* | (2006.01) |
| *G06T 7/00* | (2017.01) |
| *B22C 9/02* | (2006.01) |

(52) U.S. Cl.
CPC ............... *B22C 19/04* (2013.01); *B22C 9/02* (2013.01); *B22C 15/28* (2013.01); *G06T 7/0004* (2013.01); *G06T 2207/30116* (2013.01)

(58) Field of Classification Search
CPC ........... B22C 19/04; B22C 9/02; B22C 15/24; B22C 15/28
See application file for complete search history.

(56) References Cited

U.S. PATENT DOCUMENTS

2020/0061696 A1   2/2020   Terabe et al.

FOREIGN PATENT DOCUMENTS

| | | |
|---|---|---|
| JP | 4766210 B1 | 9/2011 |
| WO | WO-2018/207646 A1 | 11/2018 |

*Primary Examiner* — Kevin P Kerns
*Assistant Examiner* — Steven S Ha
(74) *Attorney, Agent, or Firm* — Faegre Drinker Biddle & Reath LLP (57) ABSTRACT

A molding system molding a sand mold includes a flask, a tank connected to a compressed air source, including an opened end part, and configured to internally store sand, a nozzle attached to the end part of the tank and configured to guide the sand in the tank into the flask, and a control unit configured to output information about clogging of the nozzle when, during sand filling in which the sand in the tank is introduced into the flask through the nozzle, a relationship where pressure inside the tank is higher than initial pressure during the sand filling in which the sand is introduced into the flask is satisfied.

16 Claims, 9 Drawing Sheets

MOLDING SYSTEM

TECHNICAL FIELD

The present disclosure relates to a molding system.

CROSS-REFERENCE TO RELATED APPLICATION

This application claims the benefit of priority from Japanese Patent Application No. 2022-041554, filed on Mar. 16, 2022, the entire contents of which are incorporated herein by reference.

BACKGROUND

International Publication No. WO 2018/207646 discloses a molding apparatus. The apparatus includes a tank internally storing sand, and a nozzle guiding the sand in the tank into a flask. Compressed air is supplied into the tank, and the sand in the tank is supplied into the flask through the nozzle by pressure. The pressure inside the tank is detected by a pressure sensor, and a graph representing a relationship between the pressure and a time is displayed on a display. In a case where the pressure detected by the sensor exceeds a preset threshold, a worker determines that clogging of the nozzle has occurred.

SUMMARY

In the apparatus disclosed in International Publication No. WO 2018/207646, the worker determines occurrence of clogging of the nozzle. Therefore, there is a room for improvement to more accurately detect occurrence of clogging of the nozzle. The present disclosure provides a technique to appropriately detect occurrence of clogging of the nozzle.

An aspect of the present disclosure is a molding system molding a sand mold. The molding system includes a flask, a tank, a nozzle, and a control unit. The tank is connected to a compressed air source, includes an opened end part, and is configured to internally store sand. The nozzle is attached to the end part of the tank and is configured to guide the sand in the tank into the flask. The control unit is configured to output information about clogging of the nozzle when, during sand filling in which the sand in the tank is introduced into the flask through the nozzle, a relationship where pressure inside the tank is higher than initial pressure during the sand filling in which the sand is introduced into the flask is satisfied. Clogging of the nozzle indicates a state where the sand is compressed inside the nozzle for the sand filling in which the sand is introduced into the flask and the sand filling cannot be performed due to complete closure of a flow path, or a state where a sand filling amount is lowered due to partial closure of the flow path.

In a case where clogging of the nozzle occurs, the pressure inside the tank is increased. In the molding system, the information about clogging of the nozzle is output when the relationship where the pressure inside the tank is higher than the initial pressure is satisfied during the sand filling. As described above, since clogging of the nozzle is mechanically detected, the molding system can appropriately detect occurrence of clogging of the nozzle as compared with a case where a worker determines clogging.

Another aspect of the present disclosure is a molding system molding a sand mold. The molding system includes a flask, a tank, a nozzle, and a control unit. The tank is connected to a compressed air source, includes an opened end part, and is configured to internally store sand. The nozzle is attached to the end part of the tank and is configured to guide the sand in the tank into the flask. The control unit is configured to output information about clogging of the nozzle when, during sand filling in which the sand in the tank is introduced into the flask through the nozzle, a relationship where pressure change inside the tank is greater than initial pressure change during the sand filling in which the sand is introduced into the flask is satisfied.

In the case where clogging of the nozzle occurs, the pressure change inside the tank is increased. In the molding system, the information about clogging of the nozzle is output when the relationship where the pressure change inside the tank is greater than the initial pressure change is satisfied during the sand filling. As described above, since clogging of the nozzle is mechanically detected, the molding system can appropriately detect occurrence of clogging of the nozzle as compared with the case where the worker determines clogging. Further, the molding system can appropriately detect occurrence of clogging of the nozzle as compared with detection using a threshold, by detecting occurrence of clogging of the nozzle based on transition of the pressure (pressure change) inside the tank.

In one embodiment, when the above-described relationship is satisfied, the control unit may perform operation to eliminate clogging of the nozzle. Such a configuration enables the molding system to avoid occurrence of a molding defect due to insufficient sand filling by clogging of the nozzle.

In one embodiment, when the above-described relationship is satisfied, the control unit may issue an alarm. Such a configuration enables the molding system to notify the worker and the like of occurrence of clogging of the nozzle.

In one embodiment, the molding system may further include an analysis apparatus configured to image the sand mold and to perform appearance inspection of the sand mold based on a captured image, and the control unit may output the information to the analysis apparatus when the above-described relationship is satisfied. Such a configuration enables the molding system to perform image analysis of the sand mold molded when clogging of the nozzle occurs.

In one embodiment, the analysis apparatus may further include an external force application apparatus applying, in a case where the information is acquired from the control unit, pneumatic pressure to the sand mold before the sand mold is imaged. Such a configuration enables the molding system to move and remove the sand falling on a surface of the sand mold by the pneumatic pressure.

In one embodiment, the analysis apparatus may be configured to switch a standard mode in which the sand mold is imaged at first magnification and a high-magnification mode in which the sand mold is imaged at magnification higher than the first magnification, and in the case where the information is acquired from the control unit, the analysis apparatus may image the sand mold at least in the high-magnification mode. Such a configuration enables the molding system to perform image analysis on the sand mold molded when clogging of the nozzle occurs, in more detail.

In one embodiment, the molding system may further include a squeezing mechanism configured to squeeze the sand filled in the flask, a sand cutter configured to arrange a shape of the sand mold, and a pressure sensor configured to detect squeeze pressure, the control unit may determine whether the squeezing by the squeezing mechanism has normally ended, based on a detection result of the pressure sensor, and the sand cutter may change operation based on presence/absence of clogging of the nozzle and whether the squeezing has normally ended. Hardness of the sand mold (mold strength) may be different between a case where the squeezing has normally ended and a case where the squeezing has not normally ended. The sand cutter of the molding system changes the operation based on whether the squeezing has normally ended. This makes it possible to avoid destruction of the sand mold.

In one embodiment, in a case where the above-described relationship is not satisfied, and it is determined by the control unit that the squeezing has normally ended, the sand cutter may operate to cause a relative speed between the sand mold and a blade to be a first speed, and in a case where the above-described relationship is satisfied and it is determined by the control unit that the squeezing has not normally ended, the sand cutter may operate to cause the relative speed between the sand mold and the blade to be a second speed lower than the first speed. As described above, in the case where clogging of the nozzle is present and the squeezing has not normally ended, the sand cutter slows down the relative speed between the sand mold and the blade as compared with the case where clogging of the nozzle is absent and the squeezing has normally ended. This enables the sand cutter to avoid destruction of the sand mold.

Another aspect of the present disclosure is a molding method including the following steps.

(1) A step of introducing sand in a tank into a flask from the tank through a nozzle, the tank being connected to a compressed air source, including an opened end part, and internally storing the sand, the nozzle being attached to the end part of the tank (2) A step of outputting information about clogging of the nozzle when a relationship where pressure inside the tank is higher than initial pressure during sand filling in which the sand is introduced into the flask is satisfied in the step of introducing the sand into the flask The molding method achieves the effects same as the effects by the above-described molding system.

Another aspect of the present disclosure is a molding method including the following steps.

(1) A step of introducing sand in a tank into a flask from the tank through a nozzle, the tank being connected to a compressed air source, including an opened end part, and internally storing the sand, the nozzle being attached to the end part of the tank (2) A step of outputting information about clogging of the nozzle when a relationship where pressure change inside the tank is greater than initial pressure change during sand filling in which the sand is introduced into the flask is satisfied in the step of introducing the sand into the flask The molding method achieves the effects same as the effects by the above-described molding system.

According to the technique of the present disclosure, the technique to appropriately detect occurrence of clogging of the nozzle is provided.

DETAILED DESCRIPTION

An embodiment of the present disclosure is described below with reference to drawings. In the following description, the same or equivalent elements are denoted by the same reference numerals, and overlapping descriptions are not repeated. Dimensional ratios of the drawings are not always coincident with described dimensional ratios. Terms "upper", "lower", "left", and "right" are based on an illustrated state as a matter of convenience.

[Example of Casting System]

Figure 1:
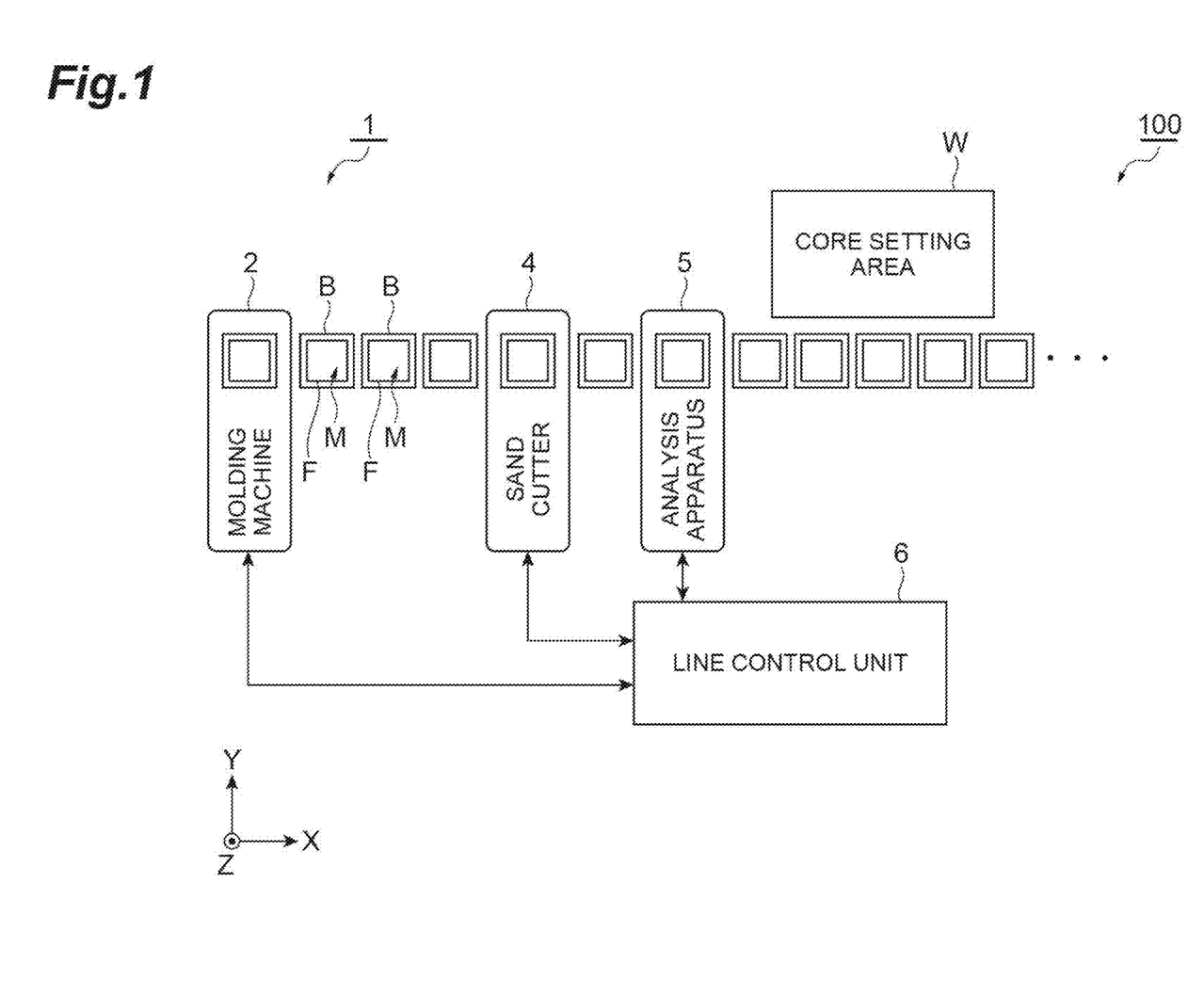
FIG. 1 is a diagram illustrating an exemplary configuration of a casting system including a molding system according to an embodiment.

FIG. 1 is a diagram illustrating an exemplary configuration of a casting system including a molding system according to the embodiment. A casting system 100 illustrated in FIG. 1 is a system to manufacture a casting. As illustrated in FIG. 1, the casting system 100 includes a molding machine 2, a conveyance line 3, a sand cutter 4, an analysis apparatus 5, and a line control unit 6 (example of control unit). An X direction and a Y direction in the figure are horizontal directions, and a Z direction is a vertical direction. The X direction, the Y direction, and the Z direction are axial directions orthogonal to one another in an orthogonal coordinate system of a three-dimensional space.

The molding machine 2 is an apparatus manufacturing a sand mold M. The molding machine 2 forms the sand mold M by using a flask F. The molding machine 2 is communicably connected to the line control unit 6. The molding machine 2 starts manufacture of the sand mold M in a molding area in response to reception of a molding start signal from the line control unit 6. The molding machine 2 puts sand (molding sand) into the flask F in which a pattern is disposed, and pressurizes and solidifies the sand in the flask F. The molding machine 2 forms the sand mold M by taking out the pattern from the solidified sand. The sand mold M is any one of paired cope and drag.

The conveyance line 3 is a facility conveying the sand mold M from an upstream to a downstream. The conveyance line 3 receives the sand mold M from the molding machine 2, and conveys the sand mold M toward a molten metal pouring machine (not illustrated) on the downstream. The conveyance line 3 may include, for example, a roller conveyor, a rail, a truck on which the sand mold M and the flask F are placed and running on the rail, a pusher apparatus disposed on the molding machine 2 side, and a cushion apparatus disposed on the molten metal pouring machine side. In a case where the conveyance line 3 includes a driving roller, a roller running surface is provided on a molding board B. The conveyance line 3 sequentially conveys a plurality of sand molds M and a plurality of flasks F arranged with equal intervals on the roller conveyor or the rail, from the molding machine 2. The conveyance line 3 is intermittently driven, and conveys the sand molds M and the flasks F by a predetermined number of flasks. The predetermined number of flasks may be one flask or a plurality of flasks. The conveyance line 3 is communicably connected to the line control unit 6. The conveyance line 3 conveys the plurality of sand molds M and the plurality of flasks F by the predetermined number of flasks in response to reception of a flask feeding signal from the line control unit 6. In a case where conveyance for the predetermined number of flasks is completed, the conveyance line 3 transmits a flask feeding completion signal to the line control unit 6.

The sand cutter 4 is provided in the conveyance line 3, and adjusts a shape of the sand mold M. The sand cutter 4 adjusts the shape of the sand mold M by, for example, applying a blade to the sand mold M under conveyance. The sand cutter 4 is communicably connected to the line control unit 6. The sand cutter 4 operates based on a control signal of the line control unit 6. For example, the sand cutter 4 includes a lifting mechanism lifting and lowering the blade in such a way as to be close to or separated from the sand mold M. The sand cutter 4 stops the blade at a height at which the blade abuts on surplus sand of the sand mold M under conveyance, based on the control signal of the line control unit 6. As an example, the height of the blade is adjusted such that the blade abuts on the surplus sand formed on a rear surface of the sand mold M. The line control unit 6 causes the conveyance line 3 to convey the successive sand molds M by one pitch (by one flask) in a flask traveling direction in response to completion of adjustment of the blade height. As a result, when the sand mold M passes through an installation position of the sand cutter 4, the surplus sand of the sand mold M under conveyance is cut by the blade of the sand cutter 4, and the sand mold is made flat. The sand cutter 4 may also be configured such that the blade is movable in the horizontal direction based on the control signal of the line control unit 6. For example, the sand cutter 4 may cut the surplus sand of the sand mold M by moving the blade to the sand mold M under stay or under conveyance. The sand cutter 4 may adjust the shape of the sand mold M by changing a relative speed between the sand mold M and the blade. The details of the sand cutter 4 are described below.

The analysis apparatus 5 is provided in the conveyance line 3, images the sand mold M on the conveyance line 3, and performs appearance inspection of the sand mold based on a captured image. The analysis apparatus 5 may be communicably connected to the line control unit 6. The analysis apparatus 5 and the line control unit 6 may operate in cooperation with each other. The details of the analysis apparatus 5 are described below. The sand mold M that has been analyzed is conveyed to a core setting area W. A worker stays in the core setting area W, and sets a core in the sand mold M. The sand mold M in which the core has been set is conveyed to an area where post-processing is performed, by the conveyance line 3.

The line control unit 6 is a controller totally controlling the casting system 100. The line control unit 6 is communicably connected to the molding machine 2, the conveyance line 3, the sand cutter 4, and the analysis apparatus 5. The line control unit 6 cooperates with the molding machine 2, the conveyance line 3, the sand cutter 4, and the analysis apparatus 5 to constitute a molding system 1. The molding system 1 may not include the sand cutter 4 and the analysis apparatus 5.

[Details of Molding System]

Figure 2:
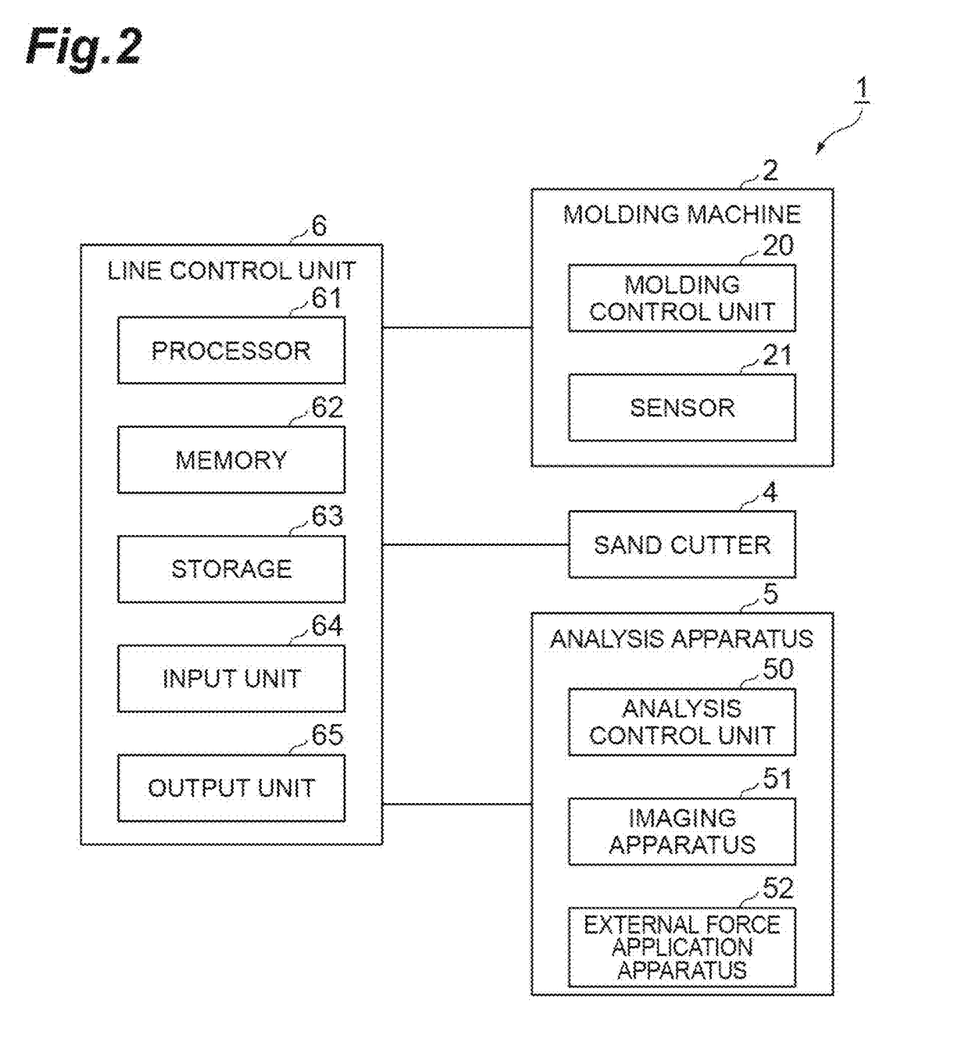
FIG. 2 is a configuration block diagram of the molding system illustrated in FIG. 1.

FIG. 2 is a configuration block diagram of the molding system illustrated in FIG. 1. As illustrated in FIG. 2, the molding system 1 includes the molding machine 2, the sand cutter 4, the analysis apparatus 5, and the line control unit 6.

The line control unit 6 is configured as a computer system that includes a processor 61 such as a central processing unit (CPU), a memory 62 such as a random access memory (RAM) and a read only memory (ROM), a storage 63 such as a hard disk drive (HDD), an input unit 64 such as a mouse and a keyboard, and an output unit 65 such as a display. The line control unit 6 may be configured as a programmable logic controller (PLC). The line control unit 6 realizes functions of the line control unit 6 by operating hardware under the control of the processor based on computer programs stored in the memory.

The molding machine 2 includes a molding control unit 20 and a sensor 21. The molding control unit 20 includes a processor, a memory, and the like as with the line control unit 6. The molding control unit 20 controls operation of the molding machine 2 based on an instruction from the line control unit 6. The molding machine 2 manufactures the sand mold M based on mold information received by the molding control unit 20 from the line control unit 6. The mold information includes information indicating a type of a pattern for a product. The sensor 21 acquires various kinds of data in manufacturing by the molding machine 2. The sensor 21 includes a pressure sensor PA that detects pressure inside a sand tank of the molding machine 2 described below. The sensor 21 may include a pressure sensor PB that detects squeezing pressure of the molding machine 2 described below. The molding control unit 20 outputs a result detected by the sensor 21 to the line control unit 6.

The analysis apparatus 5 includes an analysis control unit 50, an imaging apparatus 51, and an external force application apparatus 52. The analysis control unit 50 includes a processor, a memory, and the like as with the line control unit 6. The analysis control unit 50 controls operation of the imaging apparatus 51 and the external force application apparatus 52 based on instructions from the line control unit 6. The analysis control unit 50 identifies a type of the sand mold M to be inspected, based on the mold information received from the line control unit 6, and inspects the sand mold M based on the type of the sand mold M.

The imaging apparatus 51 images the sand mold M on the conveyance line 3. The imaging apparatus 51 includes a magnification variable lens and an image sensor. The imaging apparatus 51 images the sand mold M in any of a standard mode and a high-magnification mode, and outputs an image. The standard mode is a mode in which the sand mold M is imaged at first magnification, and the high-magnification mode is a mode in which the sand mold M is imaged at magnification higher than the first magnification.

The analysis control unit 50 outputs a signal indicating a result of inspection whether the sand mold M to be inspected is normal, based on the type of the sand mold M and a captured image of a surface of the sand mold M (inspection image). For example, the analysis control unit 50 handles an image of the surface of the sand mold M in a normal state as a reference image, and stores, in a storage device or the like, an image obtained through imaging of a normal sand mold M by the imaging apparatus 51, for each sand mold M. The analysis control unit 50 outputs the signal indicating the inspection result, for example, in the following manner. The analysis control unit 50 first matches colors of the inspection image and the reference image. The analysis control unit 50 then generates a difference image between the inspection image and the reference image. The analysis control unit 50 then removes noise from the difference image. The analysis control unit 50 then performs particle analysis on the difference image, to calculate characteristic amounts such as positions, areas, and lengths of blobs in the difference image.

The analysis control unit 50 determines whether each of the blobs is a defect based on a minimum defect size, and removes the blobs each determined not to be a defect from the difference image, thereby detecting the remaining blobs as defects. The analysis control unit 50 then specifies pseudo defects from the blobs included in the difference image based on, for example, colors of the blobs (defects). The pseudo defects are portions having large luminance due to, for example, reflection of light on a surface of an object, and are portions that are not essentially defects. The analysis control unit 50 removes the pseudo defects from the difference image to generate a defect image. In a case where no defect is included in the defect image, the analysis control unit 50 outputs a signal indicating that the sand mold M to be inspected is normal. In a case where a defect is included in the defect image, the analysis control unit 50 outputs a signal indicating that the sand mold M to be inspected is abnormal.

The external force application apparatus 52 applies pneumatic pressure to the sand mold M. For example, before the sand mold M is imaged, the external force application apparatus 52 applies air of a volume (800 L/min) moving the sands, to the sand mold M. As a result, the external force application apparatus 52 can move the sand adhered to a surface layer of the sand mold M, and expose a front surface of the sand mold M to be inspected. The external force application apparatus 52 is, for example, an air-sending apparatus including a fan or a blower.

[Details of Molding Machine]

Figure 3:
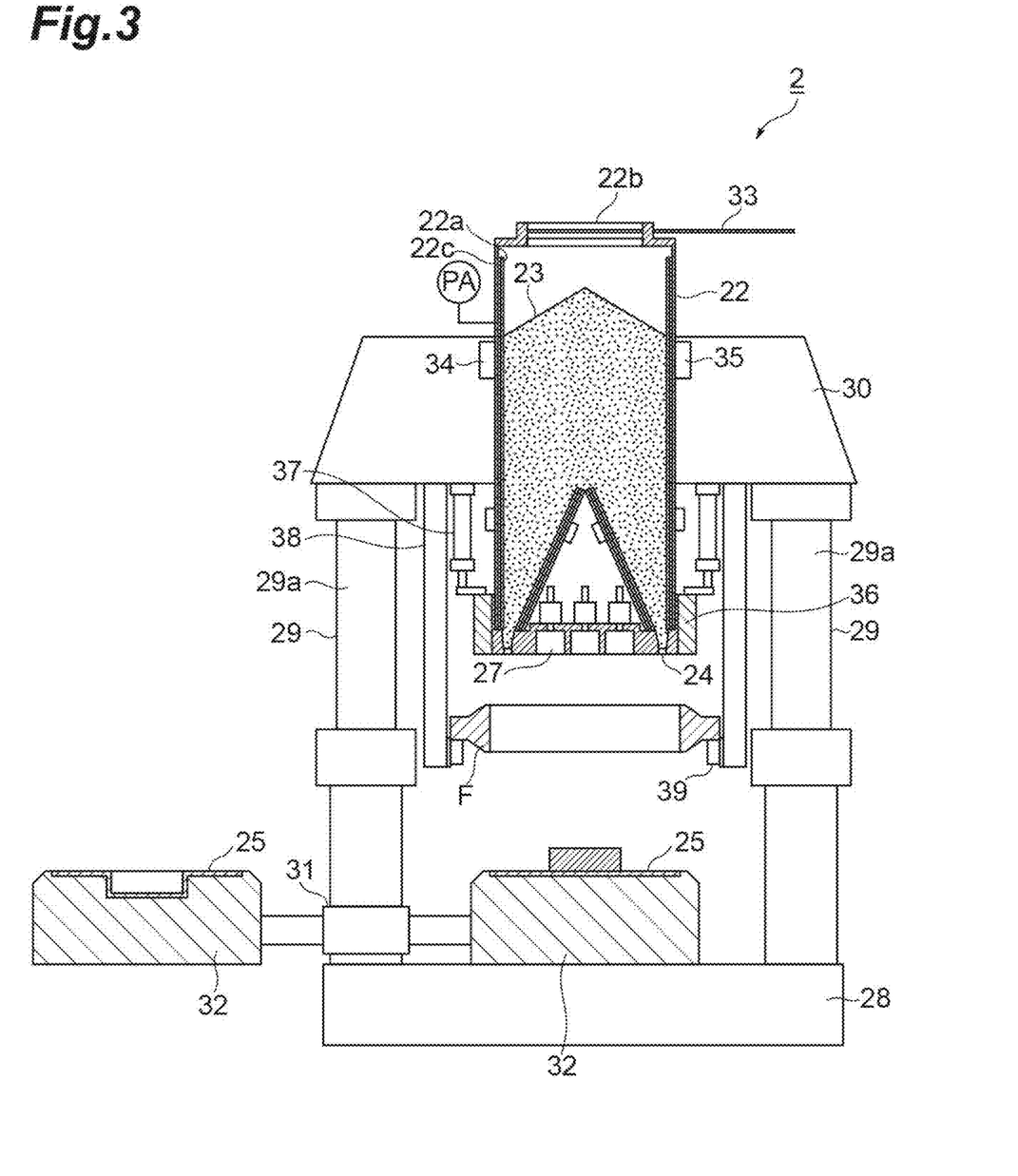
FIG. 3 is a vertical cross-sectional view illustrating a state of a molding machine (state at original position) before start of molding operation.
Figure 4:
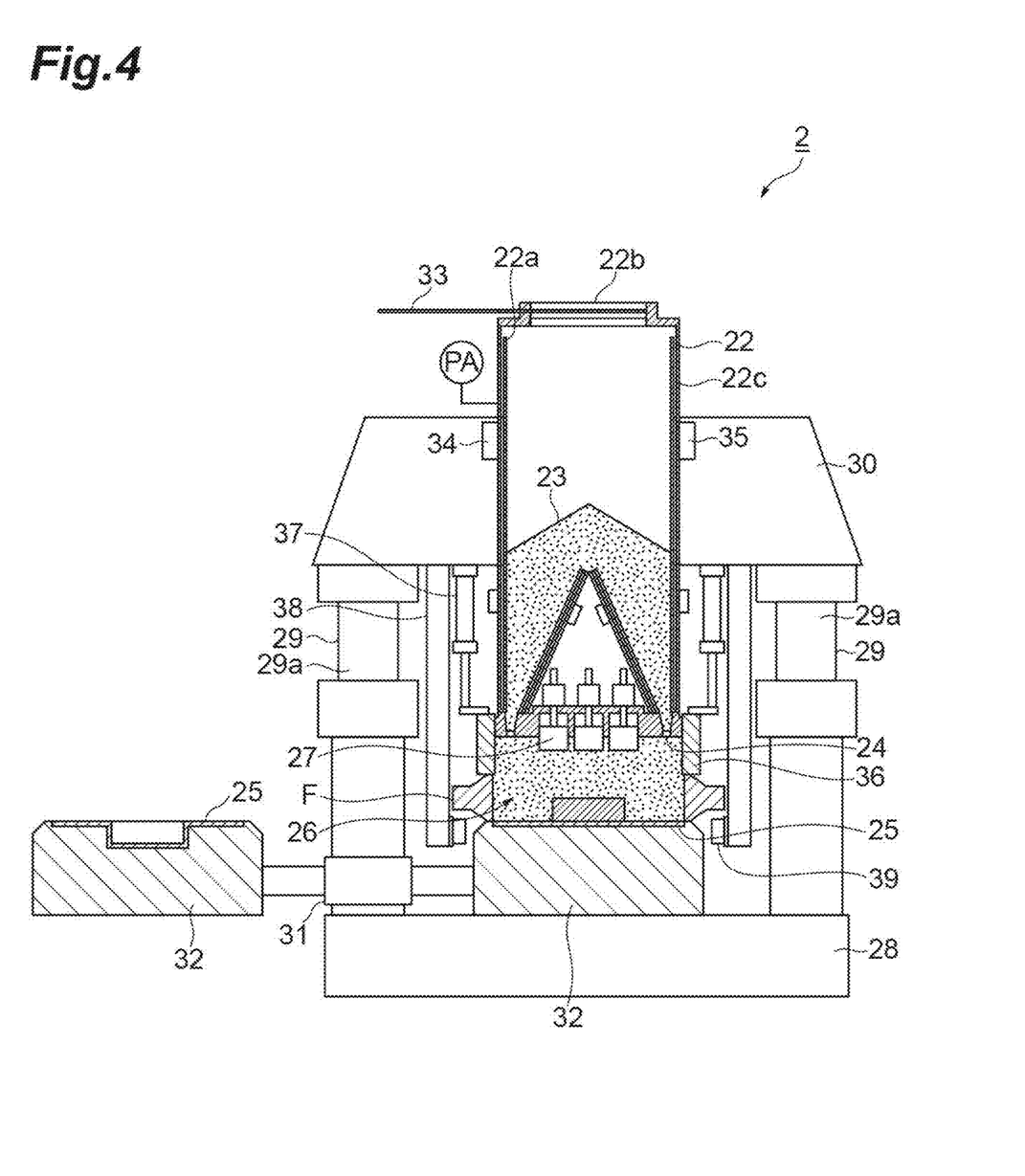
FIG. 4 is a vertical cross-sectional view illustrating a state of the molding machine in which a molding space is formed and filled with sand.
Figure 5:
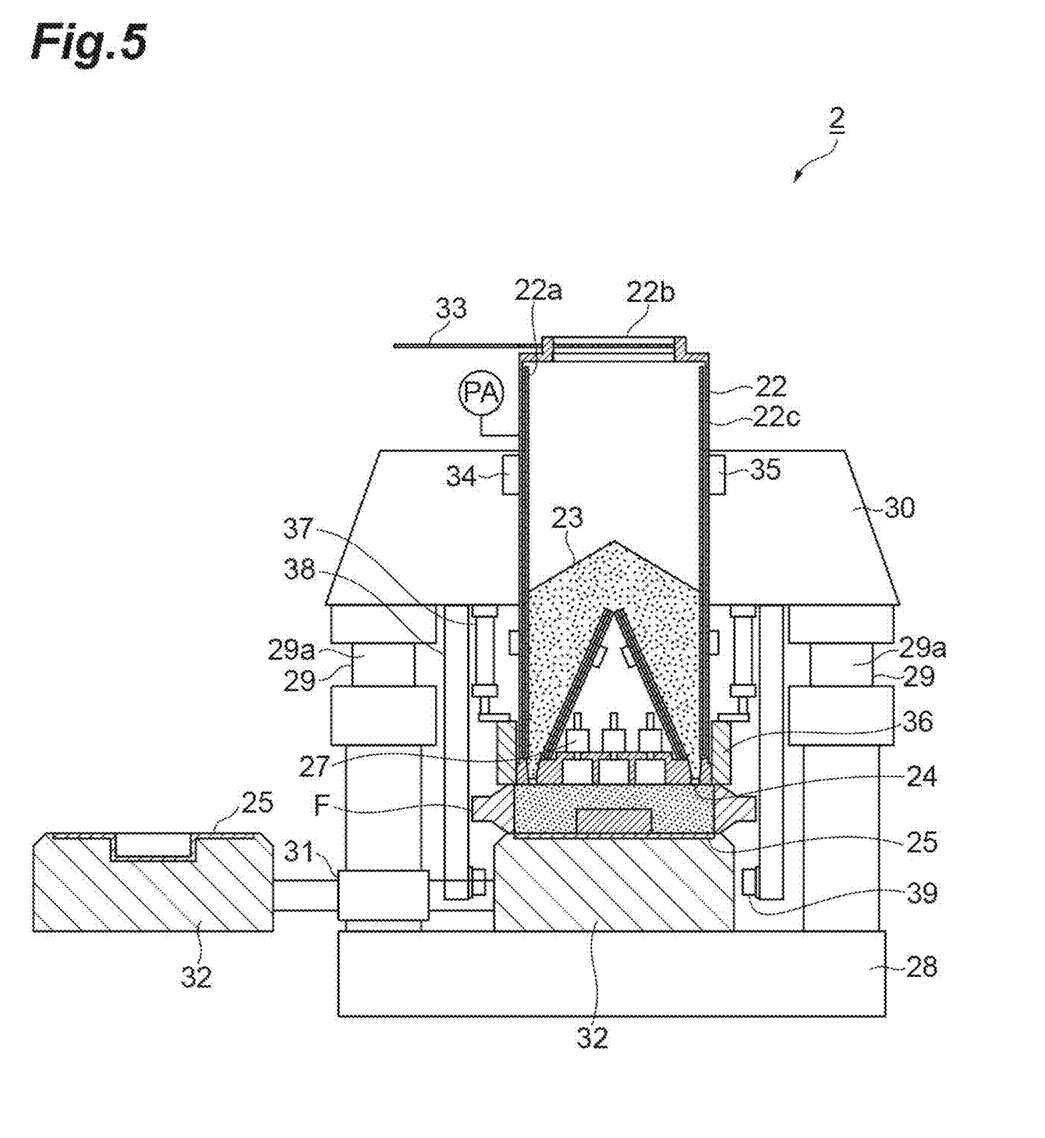
FIG. 5 is a vertical cross-sectional view illustrating a state of the molding machine in squeezing.
Figure 6:
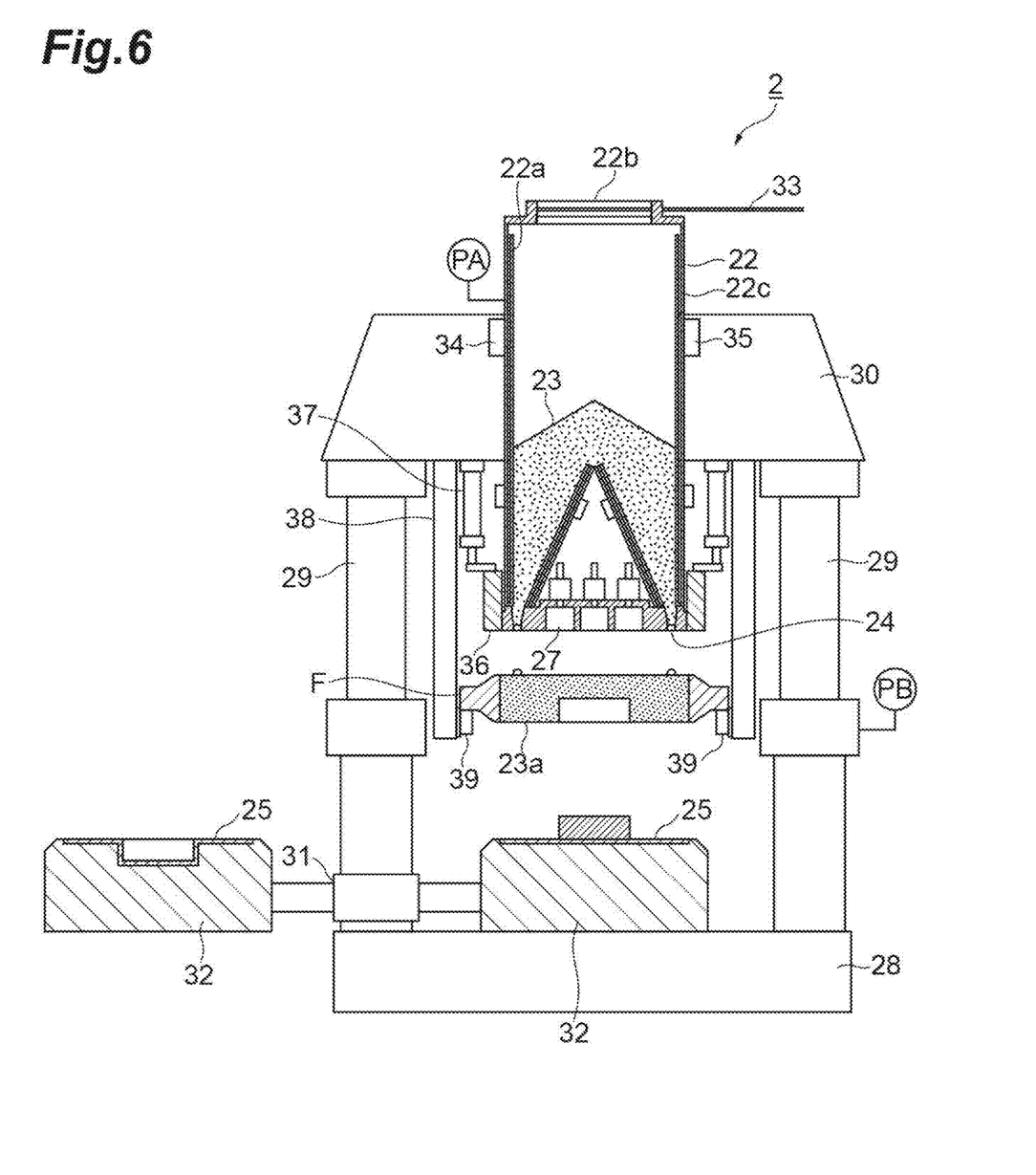
FIG. 6 is a vertical cross-sectional view illustrating a state of the molding machine returning to the original position after a mold is released.

FIG. 3 is a vertical cross-sectional view illustrating a state of the molding machine (state at original position) before start of molding operation. FIG. 4 is a vertical cross-sectional view illustrating a state of the molding machine in which a molding space is formed and filled with the sand. FIG. 5 is a vertical cross-sectional view illustrating a state of the molding machine in squeezing. FIG. 6 is a vertical cross-sectional view illustrating a state of the molding machine returning to the original position after the mold is released. FIG. 3 to FIG. 6 respectively illustrate states of "original position", "sand filling", "squeezing", and "operation returning to original position" of the molding machine 2.

As illustrated in FIG. 3 to FIG. 6, the molding machine 2 includes a sand tank 22 (example of tank). The sand tank 22 internally stores sand 23. The sand tank 22 includes, on an inner surface, a filter 22a provided with air jetting holes that are connected to an unillustrated compressed air source and jet air. A lower end part of the sand tank 22 is opened. A nozzle 24 is provided at the lower end part of the sand tank 22.

The flask F is disposed below the sand tank 22. The flask F forms, at least together with a pattern plate 25, a molding space 26 (see FIG. 4). The sand 23 stored in the sand tank 22 is guided to the molding space 26 (example of inside of flask F) by the nozzle 24.

A segmental squeeze foot 27 (example of squeezing mechanism) is provided at the lower end part of the sand tank 22 in such a way as to be adjacent to the nozzle 24. The squeeze foot 27 functions as squeezing means compressing the sand 23 filled into the molding space 26.

The molding machine 2 further includes a molding base 28. A plurality of flask set cylinders 29 are erected on the molding base 28. Further, a lifting support frame 30 is installed between front ends of piston rods 29a of the flask set cylinders 29. In other words, the flask set cylinders 29 are erected upward with ends on the molding base 28 side as retraction ends. As illustrated in FIG. 6, the pressure sensor PB detecting the squeeze pressure is provided on any of the flask set cylinders 29.

A center part of a pattern exchange apparatus 31 is supported to be rotatable in a horizontal plane, at a lower part of one of the plurality of flask set cylinders 29. A pattern carrier 32 on which the above-described pattern plate 25 is placed is set at each of end parts of the pattern exchange apparatus 31, while being lifted by about 5 mm by an unillustrated spring. The pattern carriers 32 are configured to alternately carry in/out the pattern plates 25 to a center upper part of the molding base 28.

The above-described sand tank 22 is suspended from the lifting support frame 30. A sand charging port 22b that is opened/closed by a slide gate 33 is provided at an upper end of the sand tank 22. Further, as described above, the filter 22a for jetting air is provided over the substantially entire inner surface of the sand tank 22. The filter 22a is a porous body including a large number of holes each having a size of about 10 μm to about 80 μm over the entire surface, and is made of, for example, sintered ultrahigh molecular weight polyethylene. A hollow chamber 22c is provided between the filter 22a and the inner surface of the sand tank 22. Compressed air of 0.05 MPa to 0.18 MPa is supplied to the hollow chamber 22c from the unillustrated compressed air source communicating through an upper air passage 34 and a lower air passage 35. Further, the pressure sensor PA detecting the pressure inside the sand tank 22 is provided in the hollow chamber 22c. The sand tank 22 configured as described above causes the sand 23 to float and flow by compressed air jetted from the plurality of holes provided in the filter 22a, and fills the molding space 26 with the sand 23 while causing the sand 23 to float and flow.

The squeeze foot 27 and the nozzle 24 described above form the molding space 26, together with the pattern plate 25, the flask F, and a filling frame 36. The filling frame 36 is disposed below the sand tank 22 in such a way as to be vertically movable and to surround the nozzle 24 and the squeeze foot 27. The filling frame 36 is coupled to filling frame cylinders 37 provided downward on the lifting support frame 30, and is vertically moved by the filling frame cylinders 37.

The lifting support frame 30 is provided with frames 38 that are positioned outside the sand tank 22 on the lower side, and a carrying conveyor 39 (example of conveyance line 3) carrying in/out the flask F is suspended from the lifting support frame 30 through the frames 38. The carrying conveyor 39 includes, for example, a roller conveyor.

Next, a molding method using the molding machine 2 as described above is described. In the molding method, sand filling is performed as illustrated in FIG. 4 from the original position illustrated in FIG. 3, the sand is compressed as illustrated in FIG. 5, and mold releasing operation is performed as illustrated in FIG. 6. The details thereof are described below.

FIG. 3 illustrates a state where the sand 23 is charged in the sand tank 22, and the empty flask F is carried into the carrying conveyor 39. One of the pattern carriers 32 is set on the pattern exchange apparatus 31 while being lifted by about several mm by the unillustrated spring, and has a gap with the molding base 28. Thereafter, the whole of the segmental squeeze foot 27 forms recesses and projections corresponding to projections and recesses of the pattern plate 25 disposed below. Further, the one of the pattern carriers 32 is pressure-bonded to the molding base 28 by an unillustrated clamping apparatus.

After the slide gate 33 is operated to close the sand charging port 22*b* in this state, the filling frame cylinders 37 extend to lower the filling frame 36, and press the filling frame 36 to be closely contacted with the upper surface of the flask F. In addition, the flask set cylinders 29 is retracted to cause the flask F to be closely contacted with an outer periphery of the pattern plate 25. As a result, a state where the molding space 26 is formed is attained.

Thereafter, the molding space 26 formed by the flask F, the pattern plate 25, the filling frame 36, the squeeze foot 27, the lower surface of the sand tank 22, and the like is filled with the sand 23 as illustrated in FIG. 4 while the compressed air is jetted from a large number of holes provided in the filter 22*a* into the sand tank 22, to cause the sand 23 in the sand tank 22 to float and flow. At this time, the compressed air in filling is exhausted from unillustrated vent holes provided in the filling frame 36 and the pattern plate 25. At this time, the exhaust air amount from the vent holes is controllable, which makes it possible to partially adjust filling density of the molding sand.

Thereafter, the lifting support frame 30 and members supported by the lifting support frame 30 are lowered by further retracting the flask set cylinders 29 and retracting the filling frame cylinders 37, and the sand 23 is compressed until the whole of the lower surface of the segmental squeeze foot 27 becomes flat. When such squeezing operation is performed, a state as illustrated in FIG. 5 is attained.

Next, the mold is released as illustrated in FIG. 6. The flask F is lifted by the carrying conveyor 39 while the sand tank 22 is raised, to release compressed sand 23*a* in the flask F from the pattern plate 25. Thereafter, the sand tank 22 and the carrying conveyor 39 are raised to return to the original positions in FIG. 3. The operation vertically moving the members to return to the original positions is referred to as original position returning operation. After the original position returning operation is completed, the slide gate 33 is operated to open the sand charging port 22*b*, and the sand tank 22 is refilled with the sand 23.

Next, the flask F already subjected to molding is carried out in the horizontal direction by the carrying conveyor 39, and the empty flask F is carried in. In addition, the pattern exchange apparatus 31 is rotated by 180 degrees, and the pattern plate 25 is exchanged with the pattern plate 25 placed on outside. The above-described operation is then repeated.

[Details of Sand Cutter]

Figure 7:
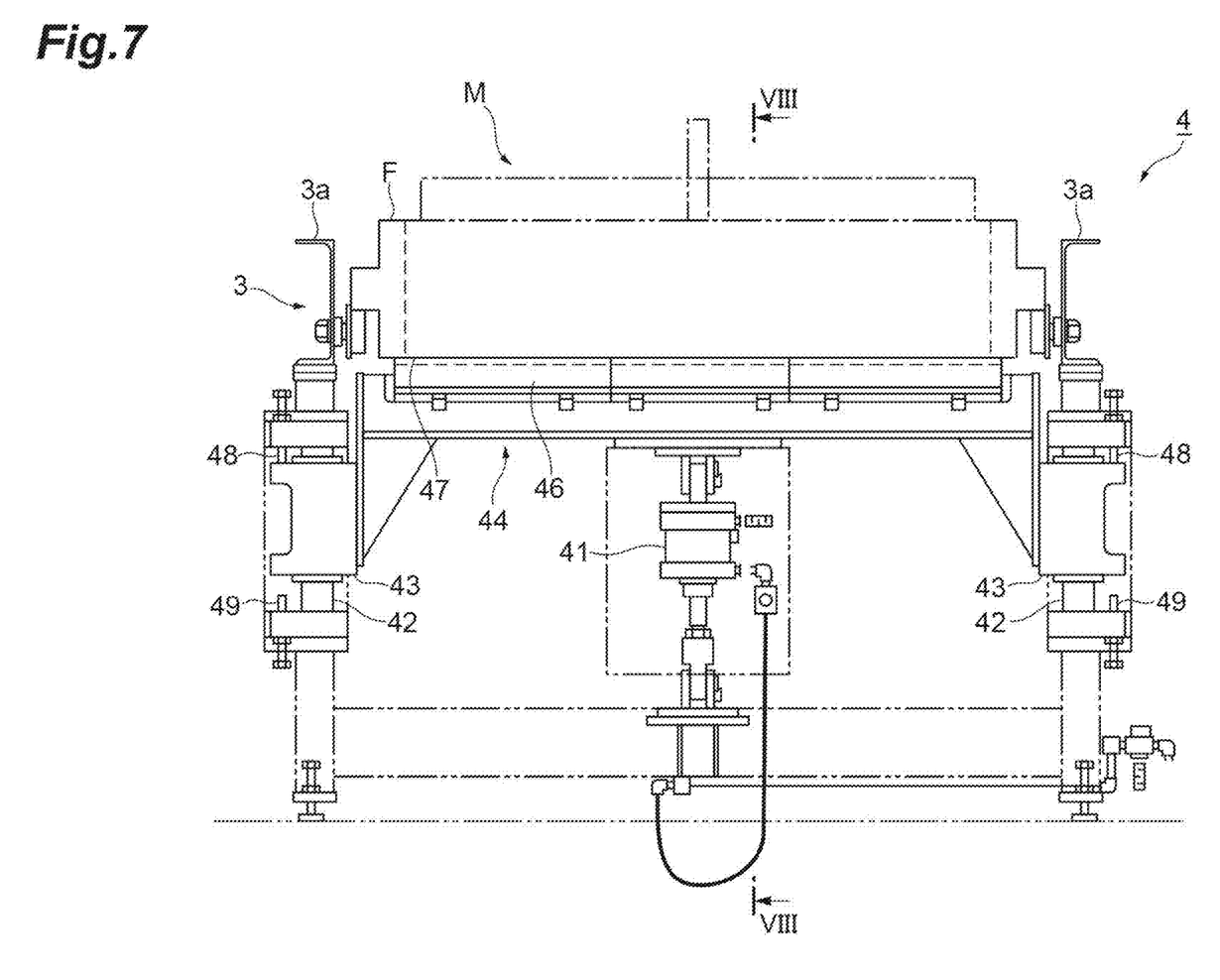
FIG. 7 is a front view of a sand cutter.
Figure 8:
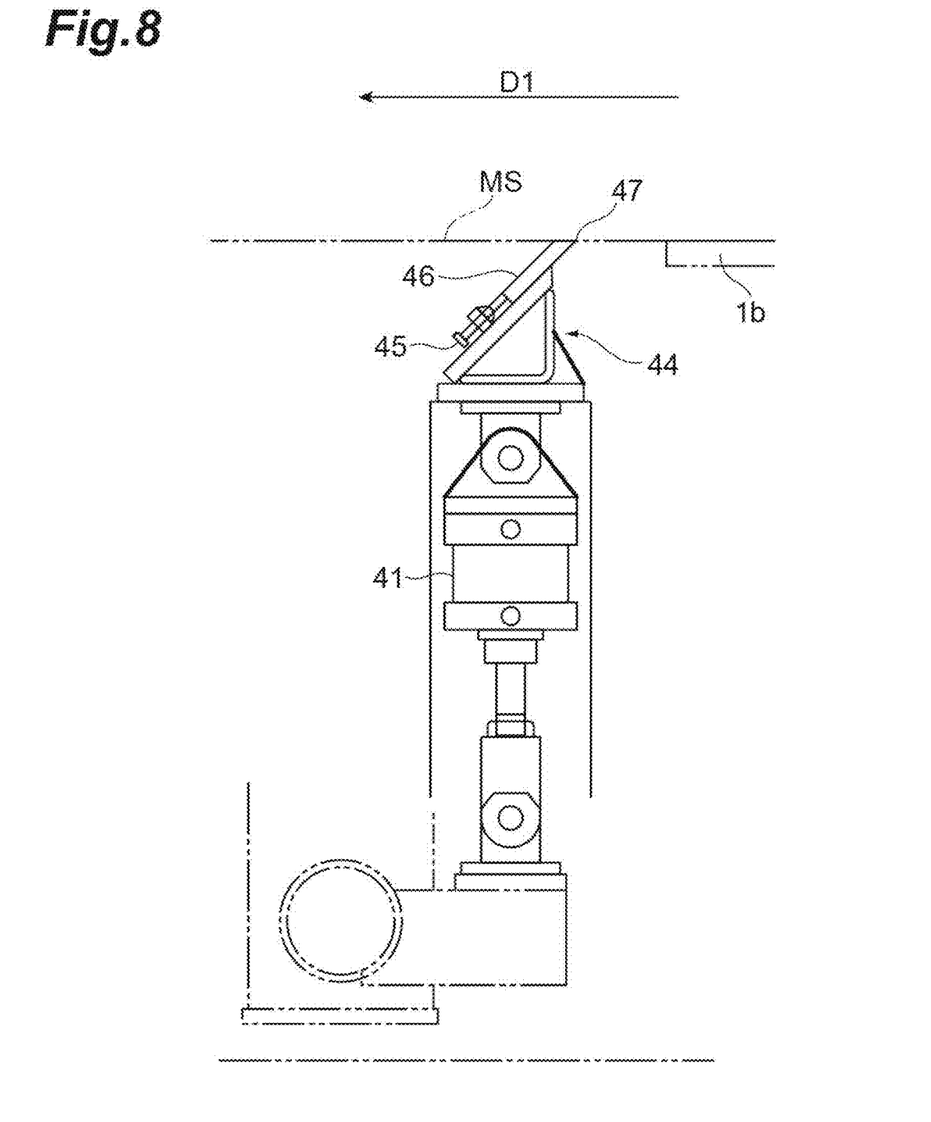
FIG. 8 is a diagram as viewed from an arrow VIII-VIII in FIG. 7.

FIG. 7 is a front view of the sand cutter. FIG. 8 is a diagram as viewed from an arrow VIII-VIII in FIG. 7. The sand cutter 4 scrapes off a sand lump (surplus sand 1*b*) from the sand mold M conveyed by the carrying conveyor 39 provided in the molding machine 2. The sand mold M to be conveyed is a mold with a flask conveyed together with the flask F.

As illustrated in FIG. 7 and FIG. 8, the sand mold M is conveyed by the conveyance line 3. Examples of the conveyance line 3 include a roller conveyer. Guide rods 42 are oppositely disposed below respective roller attachment frames 3*a* of the conveyance line 3. The guide rods 42 penetrate through respective holders 43. The holders 43 are configured to be vertically slidable to the respective guide rods 42.

A lifting frame 44 positioned between the holders 43 is coupled to the holders 43. A blade mounting base 46 that is adjustable in height by bolts 45 is attached to the lifting frame 44. A blade 47 is detachably attached to a front end of the blade mounting base 46. A cylinder 41 is coupled to a center lower part of the lifting frame 44. The holders 43 are configured to abut on respective bolts 48 as height-adjustable stoppers at rising ends, and to abut on respective bolts 49 as height-adjustable stoppers at lowering ends.

Before the sand mold M is conveyed, the blade 47 is raised by extension of the cylinder 41. Further, the blade 47 is fixed at a predetermined height, and a height dimension from a rear surface of the flask F to a top of the blade 47 is adjusted to a desired dimension by the bolts 45 and the bolts 48. For example, the height dimension is set to 0.5 mm. Further, in this state, the conveyance line 3 conveys the sand mold M by one pitch (one flask) in a conveyance direction D1. During conveyance, the surplus sand 1*b* is cut by the blade 47. As a result, the height dimension from the rear surface of the flask F to a protruding rear surface MS of the sand mold M is made to 0.5 mm, and the rear surface MS of the sand mold M is made flat. In a case where the surplus sand 1*b* of one of an upper flask or a lower flask is not cut, it is sufficient to retract the cylinder 41.

The sand cutter 4 is not limited to the apparatus illustrated in FIG. 7 and FIG. 8, and can be variously modified. For example, the sand cutter may include a configuration in which the sand cutter moves to come close to the sand mold M from a direction orthogonal to the conveyance direction D1 of the sand mold M. In this case, the sand cutter operates to scrape the rear surface MS of the sand mold M. As a specific example, the sand cutter scrapes the surplus sand on the rear surface MS of the sad mold M by causing the blade to run toward the sand mold M in response to reception of the flask feeding completion signal from the line control unit 6. The sand cutter outputs a sand cut completion signal to the line control unit 6. The line control unit 6 causes the conveyance line 3 to convey the sand mold M in response to reception of the sand cut completion signal.

[Operation of Line Control Unit]

(Nozzle Clogging Detection)

During sand filling in which the sand in the sand tank 22 is introduced into the flask F through the nozzle 24, when a where the pressure inside the sand tank 22 is higher than initial pressure during the sand filling in which the sand is introduced into the flask F is satisfied, the line control unit 6 outputs information about clogging of the nozzle 24. Alternatively, during the sand filling in which the sand in the sand tank 22 is introduced into the flask F through the nozzle 24, when a relationship where pressure change inside the sand tank 22 is greater than initial pressure change during the sand filling in which the sand is introduced into the flask F is satisfied, the line control unit 6 may output the information about clogging of the nozzle 24. The information about clogging of the nozzle 24 is, for example, characters, a symbol, a figure, sound, an image, or vibration indicating occurrence of clogging of the nozzle 24. In the following, some examples in which it is determined whether the above-described relationship is satisfied are described.

(Example in which Pressure Measured by Sensor is Determined)

As an example, the line control unit 6 includes the memory 62 storing the pressure inside the sand tank 22 during the filling with the sand 23, detected by the pressure sensor PA. The line control unit 6 may store, in the memory 62, the pressure (measured value at detection) detected by the pressure sensor PA in association with a time. The time to be associated is a time when the pressure is measured. As a result, pressure transition is stored in the memory 62. The detected pressure and the pressure transition may be stored not in the memory 62 but in the storage 63.

The line control unit 6 acquires the pressure or the pressure transition inside the sand tank 22 during the filling with the sand 23 by referring to the memory 62. As an example, the memory 62 previously stores initial pressure or initial pressure change inside the sand tank 22. The initial pressure and the initial pressure change are predetermined pressure and predetermined pressure transition (with time) in order to detect occurrence of clogging of the nozzle. As an example, the initial pressure and the initial pressure change are detection results of the pressure sensor PA when the flask F is filled with the sand 23 at the time of first activation of the molding system 1. The time of first activation may be a time when filling with the sand 23 is performed for the first time after factory shipment, a time when filling with the sand 23 is performed for the first time after pattern change, or a time when filling with the sand 23 is performed for the first time in an operation day. The initial pressure and the initial pressure change may be stored not in the memory 62 but in the storage 63.

In a case where a relationship where the pressure detected by the pressure sensor PA is higher than the initial pressure is satisfied with reference to the memory 62, the line control unit 6 outputs the information about clogging of the nozzle 24. As described above, the line control unit 6 stores a pressure value in a storage medium and compares the pressure value with the initial pressure as a threshold, thereby determining whether the above-described relationship is satisfied. In a case where a relationship where the pressure change detected by the pressure sensor PA is greater than the initial pressure change is satisfied with reference to the memory 62, the line control unit 6 may output the information about clogging of the nozzle 24. As described above, the line control unit 6 may store the pressure value in the storage medium and compares the pressure value with the initial pressure change as a threshold, thereby determining whether the above-described relationship is satisfied.

(Example in which Expansion Amount of Tank is Determined)

The line control unit 6 may include a table in which the pressure and an expansion amount of the sand tank 22 are associated with each other. Such a table may be previously stored in the memory 62, or may be realized by an electronic circuit as hardware. The expansion amount of the sand tank 22 is measured by using, for example, a noncontact distance sensor. The line control unit 6 can acquire the pressure inside the sand tank 22 based on the expansion amount of the sand tank 22 and the table. The line control unit 6 can compare the pressure inside the sand tank 22 derived from the table with the initial pressure stored in the memory 62, and determine whether the relationship where the pressure inside the sand tank 22 is higher than the initial pressure is satisfied. Alternatively, the line control unit 6 can compare the pressure change inside the sand tank 22 derived from the table with the initial pressure change stored in the memory 62, and determine whether the relationship where the pressure change inside the sand tank 22 is greater than the initial pressure change is satisfied. The line control unit 6 can also convert the initial pressure and the initial pressure change to an initial expansion amount as a threshold, in addition to conversion of the expansion amount into the pressure inside the sand tank 22 and determination. In this case, the line control unit 6 can determine whether the relationship where the pressure inside the sand tank 22 is higher than the initial pressure is satisfied only by comparing the expansion amount and the initial expansion amount. As described above, the line control unit 6 can determine whether the above-described relationship is satisfied, based on the elapsed time. In the case of using the table, the molding machine 2 may not include the pressure sensor PA.

(Example in which Image Change Amount is Determined)

The line control unit 6 may acquire an image from a camera (not illustrated) that performs image recognition of the pressure sensor PA. The pressure sensor PA is an analog pressure meter as an example. The line control unit 6 can detect that the analog pressure meter measures pressure higher than the initial pressure, through a pattern matching technique or the like. As a result, the line control unit 6 can determine whether the relationship where the pressure inside the sand tank 22 is higher than the initial pressure is satisfied. Alternatively, the line control unit 6 may acquire an image change amount from difference between images changed with time, and detect that the analog pressure meter indicates pressure change greater than the initial pressure change. In this case, the line control unit 6 can determine whether the relationship where the pressure change inside the sand tank 22 is greater than the initial pressure change is satisfied. As described above, the line control unit 6 can determine whether the above-described relationship is satisfied, based on image recognition.

Figure 9:
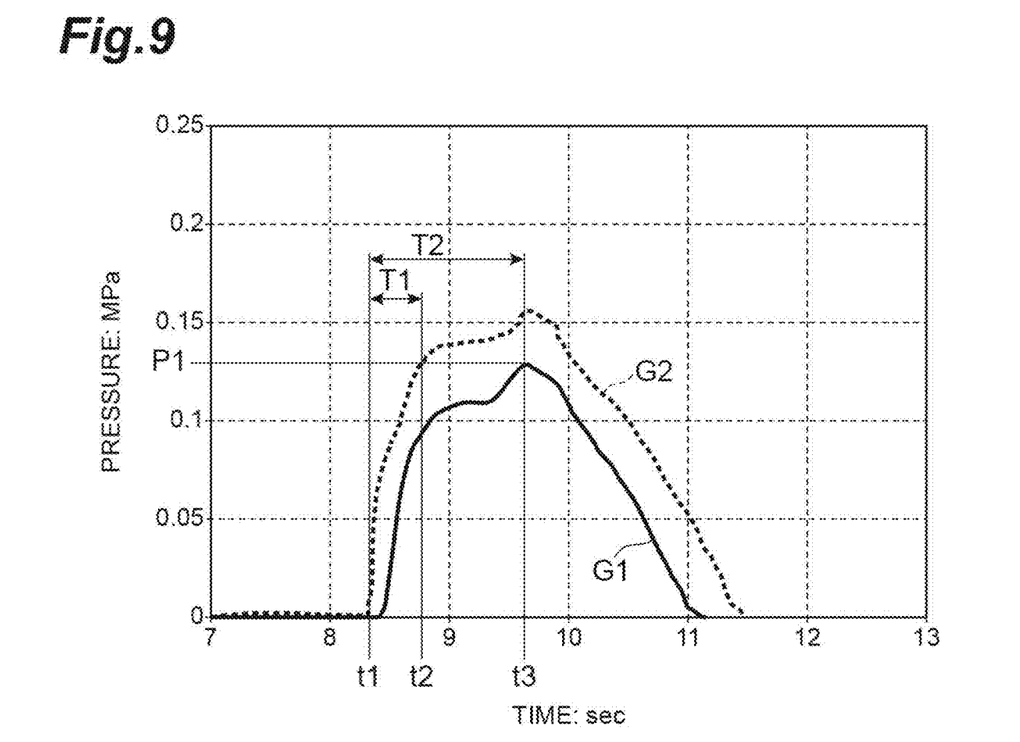
FIG. 9 is a graph illustrating initial pressure change inside a sand tank and pressure change when detected.

FIG. 9 is a graph illustrating the initial pressure change inside the sand tank and the pressure change when detected. In the graph illustrated in FIG. 9, the abscissa represents a time, and the ordinate represents pressure. A graph G1 represents the initial pressure change previously stored in the memory 62. The initial pressure change is a graph of transition of the pressure inside the sand tank 22 when clogging of the nozzle does not occur. A graph G2 represents transition of the pressure inside the sand tank 22 detected by the pressure sensor PA. The line control unit 6 determines presence/absence of clogging of the nozzle 24 by comparing the graph G1 and the graph G2. As illustrated in the graph G2, in a case where clogging of the nozzle 24 occurs, the pressure inside the sand tank 22 makes a characteristic transition. More specifically, the graph G2 is short in time until the pressure reaches a predetermined pressure (for example, pressure P1) as compared with the graph G1. Further, the maximum attained pressure is different. The line control unit 6 may determine presence/absence of clogging of the nozzle 24 based on comparison of the overall characteristics described above. The line control unit 6 may detect occurrence of clogging of the nozzle based on transition of the difference between the graph G1 and the graph G2.

(Clogging Elimination Operation)

In a case where the above-described relationship of the pressure or the pressure change is satisfied (namely, in case where it is determined that clogging of nozzle 24 is present), the line control unit 6 instructs the molding machine 2 to perform clogging elimination operation. For example, the molding control unit 20 increases an amount of compressed air supplied into the sand tank 22 based on the instruction of the line control unit 6. As a result, the pressure inside the sand tank 22 is raised, and the sand 23 clogging the nozzle 24 can be blown away.

(Alarm Operation)

In the case where the above-described relationship of the pressure or the pressure change is satisfied (namely, in case where it is determined that clogging of nozzle 24 is present), the line control unit 6 may issue an alarm. The alarm indicates abnormality notification to the worker and the like. As an example of alarm processing, the line control unit 6 displays a screen about the alarm on the output unit 65. Alternatively, the line control unit 6 may sound alarm tone from an unillustrated speaker or light an alarm lamp in place of or in addition to the alarm by display.

(Cooperation with Analysis Apparatus)

In the case where the above-described relationship of the pressure or the pressure change is satisfied (namely, in case where it is determined that clogging of nozzle 24 is present), the line control unit 6 outputs information about presence/absence of clogging to the analysis apparatus 5. In a case where the pressure inside the sand tank 22 acquired from the pressure sensor PA reaches the initial pressure earlier than a predetermined standard time, the line control unit 6 may output the information about presence/absence of clogging to the analysis apparatus 5. The predetermined standard time is stored in, for example, the memory 62 (example of time storage unit). The standard time may be stored not in the memory 62 but in the storage 63. A time t3 illustrated in FIG. 9 is a time until the pressure reaches the pressure P1 as a predetermined threshold. In the case where the pressure inside the sand tank 22 acquired from the pressure sensor PA reaches the initial pressure (for example, time t2 in figure) earlier than the predetermined standard time (time t3), the line control unit 6 determines that the sand mold M is formed in a state where clogging of the nozzle 24 occurs, and outputs the information about presence/absence of clogging to the analysis apparatus 5.

The analysis apparatus 5 changes operation in response to acquisition of the information about presence/absence of clogging from the line control unit 6. For example, in a case where the analysis apparatus 5 acquires the information about presence/absence of clogging from the line control unit 6, the analysis apparatus 5 operates the external force application apparatus 52 to apply pneumatic pressure to the sand mold M before the sand mold M is imaged. The external force application apparatus 52 applies air of a volume (800 L/min) moving the sands, to the sand mold M before the sand mold M is imaged. As a result, the external force application apparatus 52 can move the sand adhered to the surface layer of the sand mold M, and expose the front surface of the sand mold M to be inspected. Alternatively, in the case where the analysis apparatus 5 acquires the information about presence/absence of clogging from the line control unit 6, the analysis apparatus 5 may cause the sand mold M to be imaged in the high-magnification mode. As described above, in the case where the information about presence/absence of clogging is acquired, the analysis apparatus 5 can operate to more cautiously perform analysis.

(Cooperation with Sand Cutter)

The line control unit 6 determines whether the squeezing has normally ended based on the detection result (squeeze pressure) of the pressure sensor PB. For example, the line control unit 6 compares the pressure acquired in a normal state and the detection result of the pressure sensor P. In a case where the detection result is a threshold or less, the line control unit 6 determines that the squeezing has not normally ended. The sand cutter 4 changes operation based on presence/absence of clogging of the nozzle 24 and whether the squeezing has normally ended.

For example, when the squeezing has normally ended (in case where line control unit 6 determines that clogging of nozzle 24 is absent and squeezing has normally ended), the line control unit 6 operates the conveyance line 3 such that a relative speed between the sand mold M and a blade 47 becomes a first speed. When the squeezing has abnormally ended (in case where line control unit 6 determines that clogging of nozzle 24 is present and squeezing has not normally ended), the line control unit 6 operates the conveyance line 3 such that the relative speed between the sand mold M and the blade 47 becomes a second speed lower than the first speed. In a case where the sand cutter 4 includes the moving configuration, when the squeezing has normally ended, the sand cutter 4 operates the blade 47 such that the relative speed between the sand mold M and the blade 47 becomes the first speed. When the squeezing has abnormally ended, the sand cutter 4 operates the blade 47 such that the relative speed between the sand mold M and the blade 47 becomes the second speed lower than the first speed.

(Summary of Embodiment)

According to the molding system 1, when the relationship where the pressure inside the sand tank 22 during the sand filling in which the sand 23 in the sand tank 22 is introduced into the flask F through the nozzle 24 is higher than the initial pressure is satisfied, the information about clogging of the nozzle 24 is output. As described above, since clogging of the nozzle is mechanically detected, the molding system can appropriately detect occurrence of clogging of the nozzle as compared with a case where the worker determines clogging.

In the case where the above-described relationship of the pressure or the pressure change is satisfied (namely, in case where it is determined that clogging of nozzle 24 is present), the molding system 1 performs operation to eliminate clogging of the nozzle 24. Therefore, it is possible to avoid occurrence of a molding defect due to insufficient sand filling by clogging of the nozzle.

In the case where the above-described relationship of the pressure or the pressure change is satisfied (namely, in case where it is determined that clogging of nozzle 24 is present), the molding system 1 issues an alarm. Therefore, it is possible to notify the worker and the like of clogging of the nozzle 24.

In the case where the above-described relationship of the pressure or the pressure change is satisfied (namely, in case where it is determined that clogging of nozzle 24 is present), the molding system 1 outputs the information about presence/absence of clogging to the analysis apparatus 5. Therefore, the molding system 1 can perform image analysis of the sand molding M molded when clogging of the nozzle 24 occurs.

In the case where the above-described relationship of the pressure or the pressure change is satisfied (namely, in case where it is determined that clogging of nozzle 24 is present), the molding system 1 applies pneumatic pressure to the sand mold M by the external force application apparatus 52 before the sand mold M is imaged. Therefore, the molding system 1 can move and remove the sand falling on the surface of the sand mold M by the pneumatic pressure.

In the case where the analysis apparatus 5 acquires the information about presence/absence of clogging of the nozzle 24, the analysis apparatus 5 images the sand mold M in the high-magnification mode. Therefore, it is possible to perform the image analysis of the sand mold M molded when clogging of the nozzle 24 occurs, in more detail.

The sand cutter 4 changes operation based on whether the squeezing has normally ended, in consideration of hardness of the sand mold M (strength of mold) in the case where the squeezing has normally ended and in the case where the squeezing has not normally ended. Therefore, the sand cutter 4 can avoid destruction of the sand mold M.

In the case where it is determined that clogging of the nozzle 24 is present and it is determined that the squeezing has not normally ended, the sand cutter 4 slows down the relative speed between the sand mold M and the blade 47 as compared with the case where the squeezing has normally ended. Therefore, the sand cutter 4 can avoid destruction of the sand mold M.

The above-described embodiment is an example of the molding system according to the present disclosure. The molding system according to the present disclosure is not limited to the molding system 1 according to the embodiment, and the molding system 1 according to the embodiment may be modified or applied to the other system without departing from the spirit described in each of the claims. For example, the molding system 1 adopting the method (aeration method) in which the molding space 26 is filled with the sand 23 while the compressed air is jetted from the plurality of holes provided in the filter 22*a* on the inner surface of the sand tank 22, to cause the sand 23 to float and flow has been described; however, the molding system is not limited thereto. The molding system according to the present disclosure may adopt a blow method in which the compressed air is supplied to the sand tank 22 and the sand is blown into the flask by pressure.

What is claimed is:

1. A molding system molding a sand mold, the molding system comprising:
   a flask;
   a tank connected to a compressed air source, including an opened end part, and configured to internally store sand;
   a nozzle attached to the end part of the tank and configured to guide the sand in the tank into the flask; and
   a control unit configured to output information about clogging of the nozzle when a relationship is satisfied during sand filling in which the sand in the tank is introduced into the flask through the nozzle, the relationship where pressure inside the tank is higher than initial pressure during the sand filling in which the sand is introduced into the flask.

2. The molding system according to claim 1, wherein, when the relationship is satisfied, the control unit performs operation to eliminate the clogging of the nozzle.

3. The molding system according to claim 1, wherein, when the relationship is satisfied, the control unit issues an alarm.

4. The molding system according to claim 1, further comprising an analysis apparatus configured to image the sand mold and to perform appearance inspection of the sand mold based on a captured image, wherein
   when the relationship is satisfied, the control unit outputs the information to the analysis apparatus.

5. The molding system according to claim 4, wherein the analysis apparatus further includes an external force application apparatus applying, in a case where the information is acquired from the control unit, pneumatic pressure to the sand mold before the sand mold is imaged.

6. The molding system according to claim 4, wherein the analysis apparatus is configured to switch between a standard mode in which the sand mold is imaged at first magnification and a high-magnification mode in which the sand mold is imaged at magnification higher than the first magnification, and in a case where the information is acquired from the control unit, the analysis apparatus images the sand mold at least in the high-magnification mode.

7. The molding system according to claim 1, further comprising:
   a squeezing mechanism configured to squeeze the sand filled in the flask;
   a sand cutter configured to arrange a shape of the sand mold; and
   a pressure sensor configured to detect squeeze pressure, wherein
   the control unit determines whether the squeezing by the squeezing mechanism has normally ended, based on a detection result of the pressure sensor, and
   the sand cutter changes operation based on presence/absence of the clogging of the nozzle and whether the squeezing has normally ended.

8. The molding system according to claim 7, wherein
   in a case where the relationship is not satisfied and it is determined by the control unit that the squeezing has normally ended, the sand cutter operates to cause a relative speed between the sand mold and a blade to be a first speed, and
   in a case where the relationship is satisfied and it is determined by the control unit that the squeezing has not normally ended, the sand cutter operates to cause the relative speed between the sand mold and the blade to be a second speed lower than the first speed.

9. A molding system molding a sand mold, the molding system comprising:
   a flask;
   a tank connected to a compressed air source, including an opened end part, and configured to internally store sand;
   a nozzle attached to the end part of the tank and configured to guide the sand in the tank into the flask; and
   a control unit configured to output information about clogging of the nozzle when a relationship is satisfied during sand filling in which the sand in the tank is introduced into the flask through the nozzle, the relationship where pressure change inside the tank is greater than initial pressure change during the sand filling in which the sand is introduced into the flask.

10. The molding system according to claim 9, wherein, when the relationship is satisfied, the control unit performs operation to eliminate the clogging of the nozzle.

11. The molding system according to claim 9, wherein, when the relationship is satisfied, the control unit issues an alarm.

12. The molding system according to claim 9, further comprising an analysis apparatus configured to image the sand mold and to perform appearance inspection of the sand mold based on a captured image, wherein
    when the relationship is satisfied, the control unit outputs the information to the analysis apparatus.

13. The molding system according to claim 12, wherein the analysis apparatus further includes an external force application apparatus applying, in a case where the information is acquired from the control unit, pneumatic pressure to the sand mold before the sand mold is imaged.

14. The molding system according to claim 12, wherein the analysis apparatus is configured to switch between a standard mode in which the sand mold is imaged at first magnification and a high-magnification mode in which the sand mold is imaged at magnification higher than the first magnification, and in a case where the information is acquired from the control unit, the analysis apparatus images the sand mold at least in the high-magnification mode.

15. The molding system according to claim 9, further comprising:
    a squeezing mechanism configured to squeeze the sand filled in the flask;
    a sand cutter configured to arrange a shape of the sand mold; and
    a pressure sensor configured to detect squeeze pressure, wherein the control unit determines whether the squeezing by the squeezing mechanism has normally ended, based on a detection result of the pressure sensor, and the sand cutter changes operation based on presence/absence of the clogging of the nozzle and whether the squeezing has normally ended.

16. The molding system according to claim 15, wherein in a case where the relationship is not satisfied, and it is determined by the control unit that the squeezing has normally ended, the sand cutter operates to cause a relative speed between the sand mold and a blade to be a first speed, and in a case where the relationship is satisfied and it is determined by the control unit that the squeezing has not normally ended, the sand cutter operates to cause the relative speed between the sand mold and the blade to be a second speed lower than the first speed.

* * * * *